United States Patent
Pfadler et al.

(10) Patent No.: US 11,702,109 B2
(45) Date of Patent: Jul. 18, 2023

(54) METHOD, COMPUTER PROGRAM, APPARATUS, VEHICLE, AND TRAFFIC ENTITY FOR UPDATING AN ENVIRONMENTAL MODEL OF A VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiengesellschaft

( * ) Notice: Subject to any disclaimer, the term of this patent is extended or adjusted under 35 U.S.C. 154(b) by 337 days.

(21) Appl. No.: 17/068,922

(22) Filed: Oct. 13, 2020

(65) Prior Publication Data

US 2021/0122395 A1   Apr. 29, 2021

(30) Foreign Application Priority Data

Oct. 29, 2019   (EP) .................................... 19205893

(51) Int. Cl.
*B60W 60/00*   (2020.01)
*H04W 4/46*   (2018.01)
(Continued)

(52) U.S. Cl.
CPC ......... *B60W 60/0027* (2020.02); *G06V 20/58* (2022.01); *H04W 4/46* (2018.02); *B60W 2554/4049* (2020.02); *G05D 1/0033* (2013.01)

(58) Field of Classification Search
CPC ..... B60W 60/0027; B60W 2554/4049; H04W 4/46; G06V 20/58; G05D 1/0033
See application file for complete search history.

(56) References Cited

U.S. PATENT DOCUMENTS 10,048,700 B1   8/2018   Curlander et al.
2015/0138975 A1   5/2015   Gotz et al.
(Continued)

FOREIGN PATENT DOCUMENTS

WO   2017192358 A1   11/2017
WO   2019105640 A1   6/2019

OTHER PUBLICATIONS

Search Report for European Patent Application No. 19205893.1; dated May 15, 2020.

*Primary Examiner* — Behrang Badii
*Assistant Examiner* — Jay Khandpur
(74) *Attorney, Agent, or Firm* — Barnes & Thornburg, LLP

(57) ABSTRACT

A method, a computer program, an apparatus, a transportation vehicle, and a traffic entity for updating an environmental model at a transportation vehicle. The method for a traffic entity and for updating a first environmental model at a transportation vehicle includes receiving information related to the first environmental model from the transportation vehicle wherein the first environmental model has at least first information on an object in an environment of the transportation vehicle and the first environmental model includes confidence information related to the first information. The method also includes obtaining information related to a second environmental model of the transportation vehicle at the traffic entity wherein at least second information on the object in the environment of the transportation vehicle and the second environmental model includes confidence information related to the second information.

22 Claims, 3 Drawing Sheets

(51) Int. Cl.
    *G06V 20/58*    (2022.01)
    *G05D 1/00*    (2006.01)

(56) References Cited

U.S. PATENT DOCUMENTS

| | | |
|---|---|---|
| 2018/0151066 A1 | 5/2018 | Oba |
| 2018/0285658 A1 | 10/2018 | Günther et al. |
| 2019/0051153 A1* | 2/2019 | Giurgiu .............. G01C 21/3691 |
| 2020/0410259 A1* | 12/2020 | Srinivasan ............. G06V 20/20 |
| 2021/0103285 A1* | 4/2021 | Philbin ................ G05D 1/0088 |
| 2021/0306837 A1* | 9/2021 | Reimann ............... H04W 4/021 |
| 2022/0105954 A1* | 4/2022 | Li .......................... H04W 76/14 |
| 2022/0219721 A1* | 7/2022 | Pfadler ............. B60W 60/0027 |

* cited by examiner

```
┌─────────────────────────────────────────────────────────────┐
│ receiving information related to the first environmental   │
│ model from the vehicle, the first environmental model      │
│ comprising at least first information on an object in an   │
│ environment of the vehicle and the first environmental     │
│ model comprising confidence information related to the     │
│ first information                                           │
└─────────────────────────────────────────────────────────────┘
                              │ 12
                              ▼
┌─────────────────────────────────────────────────────────────┐
│ obtaining information related to a second environmental    │
│ model of the vehicle at the traffic entity, the second     │
│ environmental model comprising at least second information │
│ on the object in the environment of the vehicle and the    │
│ second environmental model comprising confidence           │
│ information related to the second information              │
└─────────────────────────────────────────────────────────────┘
                              │ 14
                              ▼
┌─────────────────────────────────────────────────────────────┐
│ determining information related to a confidence improvement│
│ of the first information based on the second information   │
└─────────────────────────────────────────────────────────────┘
                              │ 16
                              ▼
┌─────────────────────────────────────────────────────────────┐
│ determining a delay based on the information related to    │
│ the confidence improvement                                  │
└─────────────────────────────────────────────────────────────┘
                              │ 18
                              ▼
┌─────────────────────────────────────────────────────────────┐
│ transmitting the second information to the vehicle based   │
│ on the delay                                                │
└─────────────────────────────────────────────────────────────┘
                                                          20
                              10
```

FIG. 1

METHOD, COMPUTER PROGRAM, APPARATUS, VEHICLE, AND TRAFFIC ENTITY FOR UPDATING AN ENVIRONMENTAL MODEL OF A VEHICLE

PRIORITY CLAIM

This patent application claims priority to European Patent Application No. 19205893.1, filed 29 Oct. 2019, the disclosure of which is incorporated herein by reference in its entirety.

SUMMARY

Illustrative embodiments relate to a method, a computer program, an apparatus, a transportation vehicle, and a traffic entity for updating an environmental model of a transportation vehicle, more specifically, but not exclusively, to a concept for reducing uncertainties in an environmental model of a transportation vehicle.

BRIEF DESCRIPTION OF THE DRAWINGS

Disclosed embodiments will be described by way of example only, and with reference to the accompanying figures, in which:

FIG. 1 illustrates a block diagram of an exemplary embodiment of a traffic entity and for updating a first environmental model of a transportation vehicle;

DETAILED DESCRIPTION

Figure 2:
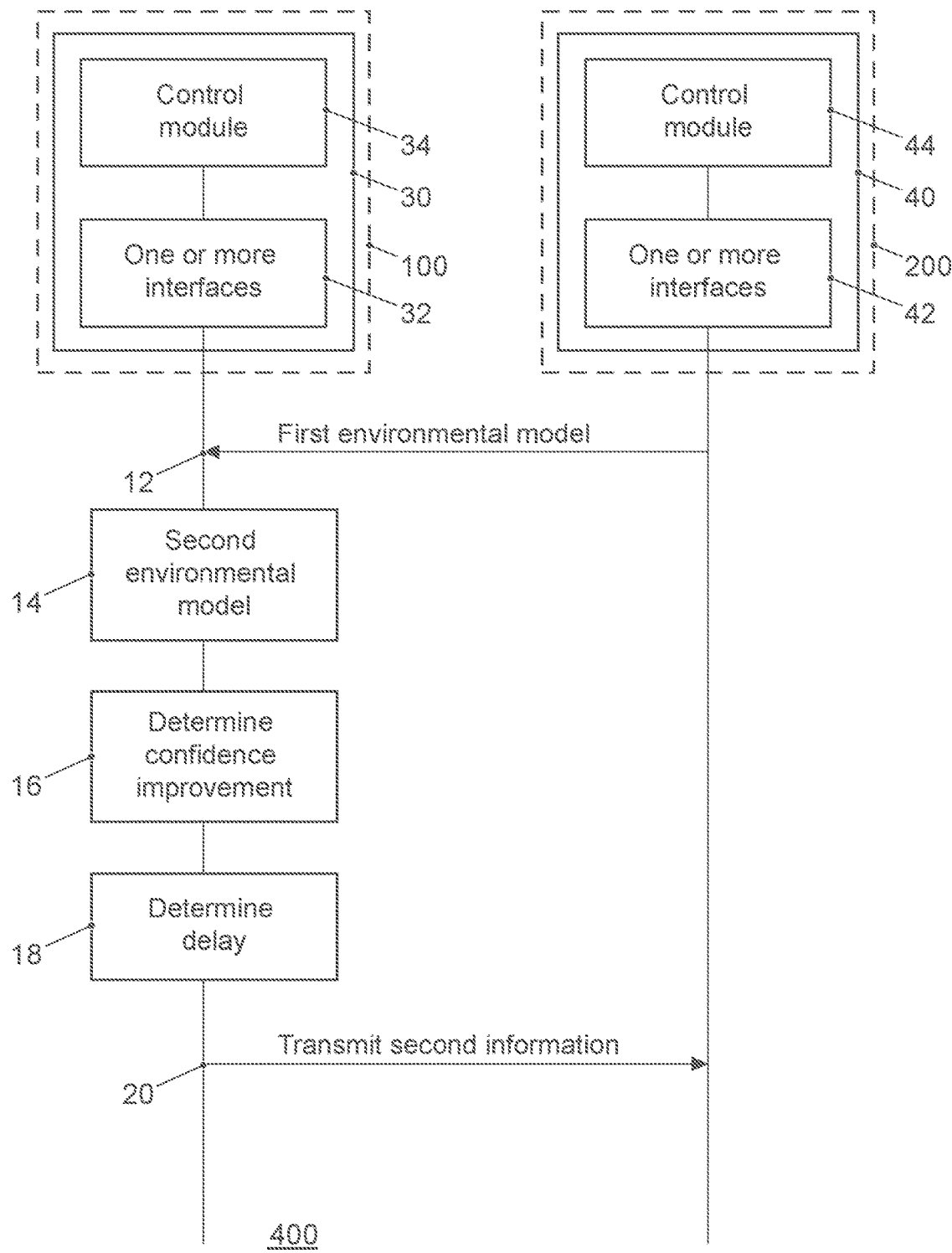
FIG. 2 illustrates a block diagram of an exemplary embodiment of an apparatus for a traffic entity and for updating a first environmental model of a transportation vehicle.

In the scope of autonomous driving, especially in higher automation levels such as L4 and L5 (high automation, full automation), the perception of the environment is critical. Even if an autonomous transportation vehicle is supported by tele-operated driving, where a transportation vehicle is driven by a remote-control center which is physically located elsewhere, the operator may require input data regarding the surrounding environment.

There are cases in which transportation vehicles require input from the outside, for instance, if a sensor malfunction occurs, a field of view is occluded, or an uncertainty in object recognition occurs. One known solution for this problem is sensor sharing, in which transportation vehicles share their environmental models on the basis of raw data or already detected objects. In both cases, the amount of sent data can overload the channel.

Document US 2018/0285658 A1 describes a device and method for characterizing objects to be identified by acquiring sensor data, which includes a first source of sensor information and a second source of sensor information. The method includes determining at least one object to be identified based on the sensor data. The method and the device also include selecting the sensor information from the first source which is assigned to the object to be identified. The method also includes characterizing the object to be identified by information based on the selected sensor information from the first source.

Document US 2015/0138975 A1 discloses a method for verifying and/or preprocessing data packets received by a receiving device in a transportation vehicle during wireless vehicle-to-environment communication, which includes: determining, in the receiving device, relevance of the received data packets; prioritizing, and verification and/or preprocessing according to their relevance, the data packets for the determination of the relevance depending on the distance between a transmitting device and the receiving device; and checking the signature of the transmitting device of the data packets and/or preprocessing the data packets in an order predefined by the prioritizing. The determination of the relevance also depends on the type of data packet and/or the type or position of the transmitting device, taking into account the position of the transmitting device based on another safety-relevant object.

Document US 2019/0051153 A1 discloses an apparatus and methods for updating a geographic database based on road object probabilities. For example, an initial value set for an existence probability that a road object exists is determined. Observation data collected from sensors of transportation vehicles are received. A total quantity of the observation data includes a first quantity of transportation vehicles that observed a presence of the road object and a second quantity of the transportation vehicles observed an absence of the road object. A presence probability indicative of a likelihood that observation data accurately describe the road object and an absence probability indicative of a likelihood that observation data accurately describe the road object are calculated to determine an updated value for the existence probability. A geographic database is updated in response to the comparison of the updated value for the existence probability to a threshold confidence level.

There is a demand for an improved communication concept for autonomously driving transportation vehicles.

Disclosed embodiments are based on the finding that teleoperated driving (remote control) is at least partially motivated by automated transportation vehicles encountering difficulties in identifying and classifying objects. Even with a teleoperated driving based solution, the control/command center may require the support of the autonomous transportation vehicle for generating and verifying trajectories. It is a finding that such help can be provided by other transportation vehicles or infrastructure in a fast and efficient way without sharing too much data. It is a basic finding that a signaling overhead between transportation vehicles can be reduced by specifying information needed in a request message to avoid being provided with redundant or useless information. Moreover, a number of response messages can be reduced by delaying messages with a lower improvement potential longer than messages with a higher improvement potential.

Disclosed embodiments provide a method for a traffic entity and for updating a first environmental model at a transportation vehicle. The method comprises receiving information related to the first environmental model from the transportation vehicle. The first environmental model comprises at least first information on an object in an environment of the transportation vehicle and the first environmental model comprises confidence information related to the first information. The method further comprises obtaining information related to a second environmental model of the transportation vehicle at the traffic entity. The second environmental model comprises at least second information on the object in the environment of the transportation vehicle and the second environmental model comprises confidence information related to the second information. The method further comprises determining information related to a confidence improvement of the first information based on the second information. The method comprises determining a delay based on the information related to the confidence improvement and transmitting the second information to the transportation vehicle based on the delay. Disclosed embodiments may efficiently reduce a number of response messages by introducing delays, which are based on the respective improvement levels.

The obtaining may comprise determining the information on the second environmental model based on sensor data of the traffic entity. The traffic entity may determine the second environmental model based on its own sensors. The first and second environmental models may hence be based on independent sensor data. Improvements may be enabled using independent environmental models.

For example, the obtaining may comprise receiving one or more messages with information related to the second environmental model from other transportation vehicles. The environmental models, be it the first or the second, may be further improved using information obtained from other transportation vehicles.

In some exemplary embodiments the method may comprise determining updated information on the first environmental model of the transportation vehicle and re-determining the information related to the confidence improvement based on the updated information before the transmitting. The method may further comprise re-determining the delay based on the re-determined information related to the confidence improvement and transmitting the second information to the transportation vehicle based on the re-determined delay. Based on an updated first environmental model the need for responding may be further evaluated. Confidence levels are likely to have improved in the update such that expected improvement levels may change.

The method may comprise overhearing a broadcast message from another traffic entity as a response to the message from the transportation vehicle and/or receiving a subsequent message to determine the updated information on the first environmental model of the transportation vehicle. Overhearing response messages or receiving updated request messages from the transportation vehicle may enable an efficient update mechanism.

The information related to the confidence improvement may indicate by how much a confidence on the existence or a property of the object could be improved in the first environmental model based on the second information. The confidence improvement may hence be used as an efficient relevance indicator.

For example, the higher the confidence improvement level the shorter the delay. Hence, more relevant information gets transmitted earlier. The confidence information may be determined by a confidence percentage and the delay may be based on an absolute improvement of the confidence percentage. Disclosed embodiments may provide efficient methods or mechanisms for traffic entities to determine whether their information is relevant to transmit.

Furthermore, the transmitting of the second information to the transportation vehicle may be carried out if the confidence improvement is above a threshold and it may be refrained from transmitting the second information otherwise. Disclosed embodiments may efficiently reduce a number of response messages and the corresponding signaling overhead.

In a further exemplary embodiment the object may be in conflict with a trajectory of the transportation vehicle. With the method an efficient mechanism may be put in place to get further information on an object in conflict with the trajectory of the transportation vehicle. For example, the first object may be a dynamic object. Hence, exemplary embodiments may enable to tailor response messages to dynamic objects, which may be particularly critical.

In some exemplary embodiments the message may be a broadcast message. That way, other traffic entities can easily overhear the message and take its content into account.

Another exemplary embodiment is an apparatus for a traffic entity and for updating a first environmental model at a transportation vehicle. The apparatus comprises one or more interfaces for communicating in a mobile communication system and a control module configured to perform one of the methods described herein. A transportation vehicle comprising an exemplary embodiment of the apparatus is another disclosed embodiment.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example exemplary embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for a traffic entity and for updating a first environmental model at a transportation vehicle 200. A traffic entity may be a transportation vehicle or an entity of traffic infrastructure (traffic light, traffic sign, railroad crossing, etc.). The method 10 comprises receiving 12 information related to the first environmental model from the transportation vehicle 200. The first environmental model comprises at least first information on an object in an environment of the transportation vehicle 200 and the first environmental model comprises confidence information related to the first information. The method 10 further comprises obtaining 14 information related to a second environmental model of the transportation vehicle 200 at the traffic entity. The second environmental model comprises at least second information on the object in the environment of the transportation vehicle 200 and the second environmental model comprises confidence information related to the second information. The method 10 comprises determining 16 information related to a confidence improvement of the first information based on the second information and determining 18 a delay based on the information related to the confidence improvement. The method 10 further comprises transmitting 20 the second information to the transportation vehicle 200 based on the delay.

An environmental model may be a digital model of the environment of the transportation vehicle, which can be based on sensor and other data. For example, a transportation vehicle can be equipped with multiple sensors, such as visual/optical (camera), radar, ultrasonic, etc. A transportation vehicle may model its surroundings using this sensor data and potentially data communicated among the traffic participants. At least in some exemplary embodiments such a model may be based on known static data, e.g., as map data comprising a course of one or more roads, intersections, traffic infrastructure (lights, signs, crossings, etc.), buildings, etc. Such a basic layer for the environmental model may be complemented by dynamic or moving objects detected through sensor data or by communicating with other transportation vehicles.

The environmental model may comprise static and dynamic objects in the environment of the transportation vehicle/traffic entity along at least a part of the transportation vehicle's trajectory. Such a part of the trajectory may be, for example, the part the transportation vehicle is planning to travel in the next 30 s, 1 minute, 5 minutes, 10 minutes, etc. A dynamic object is one that is not permanently static/fixed such as other road participants, pedestrians, vehicles, but also semi-static objects such as components of a moving construction side, traffic signs for road or lane narrowing, etc. For example, such dynamic objects may be other vehicles, pedestrians, bicycles, road participants, etc. When determining the environmental model not all objects in the model may be determined with the same confidence. There are objects for which a higher certainty can be achieved than for others. For example, if multiple sensors can identify or confirm a certain object its presence and/or state of movement can potentially be determined with a higher confidence compared to a case in which only data from a single sensor is indicative of an object.

For example, if there is an uncertainty on whether an object is really present or on a direction it is heading, such uncertainty can be determined. Disclosed embodiments may allow requesting specific information on a certain object and limiting a signaling overhead evoked by responses to such a request. This is achieved by determining a delay for transmitting a response to such a request.

FIG. 2 illustrates a block diagram of an exemplary embodiment of an apparatus 30 for a traffic entity, e.g., a transportation vehicle or infrastructure. FIG. 2 further illustrates an exemplary embodiment of a transportation vehicle 100 comprising an exemplary embodiment of the apparatus 30.

FIG. 2 shows an apparatus 30 for a traffic entity or transportation vehicle 100. The apparatus 30 is configured to update a first environmental model of the transportation vehicle 200. The apparatus 30 comprises one or more interfaces 32 for communicating in a mobile communication system. The apparatus 30 further comprises a control module 34, which is coupled to the one or more interfaces 32. The control module 34 is further configured to carry out one of the methods 10 described herein.

FIG. 2 further illustrates an apparatus 40 for a transportation vehicle 200, which comprises similar components (one or more interfaces 42, and a control module 44) as the apparatus 30. As shown in FIG. 2 the apparatus 30 may receive 12 information related to the first environmental model from the transportation vehicle 200. The first environmental model comprises at least first information on an object in an environment of the transportation vehicle 200 and the first environmental model comprises confidence information related to the first information. For example, the first object is a dynamic object, e.g., another road participant, pedestrian, etc.

As further shown in FIG. 2, at the apparatus 30 the control module 32 is configured to obtain 14 information related to a second environmental model of the transportation vehicle 200 at the traffic entity 100.

The second environmental model comprises at least second information on the object in the environment of the transportation vehicle 200 and the second environmental model comprises confidence information related to the second information. Based on the second information, information related to a confidence improvement of the first information can be determined 16. A delay is determined 18 based on the information related to the confidence improvement. The second information is transmitted 20 to the transportation vehicle 200 based on the delay.

FIG. 2 further depicts as optional component an exemplary embodiment of a traffic entity 100 (e.g., a transportation vehicle, or infrastructure component) comprising an exemplary embodiment of the apparatus 30, and a transportation vehicle 200 comprising an exemplary embodiment of apparatus 40 (which can be similar to apparatus 30). A system 400 comprising at least one disclosed embodiment of the apparatus 30 and at least one disclosed embodiment of the apparatus 40 is yet another exemplary embodiment.

The apparatuses 30, 40 and the transportation vehicles/traffic entities may communicate through a mobile communication system 400. The mobile communication system 400, as shown in FIG. 2, may, for example, correspond to one of the Third Generation Partnership Project (3GPP)- standardized mobile communication networks, where the term mobile communication system is used synonymously to mobile communication network. The messages (broadcast message, further information provided upon request) may hence be communicated through the mobile communication system 400, e.g., using direct communication between the respective entities.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/vehicles 100, 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver, transportation vehicle, or traffic entity 100, 200 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatuses 30, 40 may be comprised in a base station, a NodeB, a UE, a transportation vehicle, a relay station, or any service coordinating network entity in disclosed embodiments. It is to be noted that the term network component may comprise multiple sub-components, such as a base station, a server, etc.

In disclosed embodiments the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 34 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information, further information messages, etc.

As shown in FIG. 2 the respective one or more interfaces 32, 42 are coupled to the respective control modules 34, 44 at the apparatuses 30, 40. In exemplary embodiments the control modules 34, 44 may be implemented using one or more processing units, one or more processing devices, any method or mechanism for processing, such as a processor, a computer or a programmable hardware component being operable with accordingly adapted software. In other words, the described functions of the control modules 32, 44 may as well be implemented in software, which is then executed on one or more programmable hardware components. Such hardware components may comprise a general-purpose processor, a Digital Signal Processor (DSP), a micro-controller, etc.

FIG. 2 also shows an exemplary embodiment of a system 400 comprising disclosed embodiments of UEs/vehicles/traffic entities 100, 200. In exemplary embodiments, communication, i.e., transmission, reception or both, may take place among mobile transceivers/vehicles 100, 200 directly. Such communication may make use of a mobile communication system 400. Such communication may be carried out directly, e.g., by Device-to-Device (D2D) communication. Such communication may be carried out using the specifications of a mobile communication system 400. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 32, 42 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

In the following another embodiment will be described in detail. For example, the traffic entity 100 is a transportation vehicle that receives a request for further information from another transportation vehicle 200. For example, the obtaining 14 comprises determining the information on the second environmental model based on sensor data of the traffic entity. As outlined above the first transportation vehicle may use its sensors to obtain a first environmental model and the second transportation vehicle 200 may use its sensors to obtain the second environmental model. In some exemplary embodiments, the obtaining 14 further comprises receiving one or more messages with information related to the second environmental model from other transportation vehicles. Hence, environmental models at transportation vehicles 100, 200 may be improved by sharing information thereon between transportation vehicles. However, to save signaling overload, only messages that achieve an improvement may be signaled in some exemplary embodiments.

If such a message is received, the method 10 may further comprise determining updated information on the first environmental model of the transportation vehicle 200, re-determining the information related to the confidence improvement based on the updated information before the transmitting 20, re-determining the delay based on the re-determined information related to the confidence improvement, and transmitting the second information to the transportation vehicle 200 based on the re-determined delay.

In exemplary embodiments messages may only be sent if an improvement can be achieved. The higher the improvement the lower the delay. Hence, messages with potentially high improvements are transmitted first. Messages with lower improvements are delayed longer, they might not be transmitted at all if messages with higher improvement get transmitted first.

For example, the method 10 comprises overhearing a broadcast message from another traffic entity as a response to the message from the transportation vehicle 200 and/or receiving a subsequent message to determine the updated information on the first environmental model of the transportation vehicle 200. The information related to the confidence improvement may indicate by how much a confidence on the existence or a property of the object could be improved in the first environmental model based on the second information. The higher the confidence improvement level the shorter the delay. For example, the confidence information may be determined by a confidence percentage and the delay is based on an absolute improvement of the confidence percentage. For example, a delay may be determined directly from the percentage of confidence improvement, e.g., if a confidence on an object can be improved by 90% a short delay (e.g., 10 ms) may be applied and if a confidence on the object can be improved by 10% a longer delay (e.g., 90 ms) may be applied. Some exemplary embodiments may us a linear relation between the delay and the percentage of confidence improvement.

In some exemplary embodiments a threshold decision may be applied. For example, the transmitting 20 of the second information to the transportation vehicle 200 may be carried out if the confidence improvement is above a threshold and the method 10 comprises refraining from transmitting 20 the second information otherwise. E.g., if a confidence improvement is below 10% or 5%, no message may be transmitted.

In some exemplary embodiments a transportation vehicle may request further information about a certain object, in its environmental model, which will potentially cross or conflict with its future trajectory. The object may be in conflict with a trajectory of the transportation vehicle 200. Different transportation vehicles or infrastructure entities may reply to this request. For example, all transportation vehicles could respond to the broadcasted request of the transportation vehicle if their correctness probability (confidence) about the requested object data is higher than a probability that the requester defined (send threshold). Disclosed embodiments may avoid that all transportation vehicles send a response regardless of other vehicle/infrastructure having already sent the information with higher probability. Embodiments may make sure that entities (transportation vehicle, infrastructure) with the higher/highest correctness probability (confidence improvement) about an object reply first.

The number of response messages may be controlled by introducing response delays based on a level of improvement that can be achieved in exemplary embodiments. In other words, if a response message comprises a high improvement, because the responder is very confident on the information provided, the response message is sent directly (early, with a low delay). Other potential responders with lower improvement levels (and therefore longer delays) may overhear the message and refrain from responding. That way, message responses with the highest improvement may be sent first, thereby avoiding transmission of response messages with a lower improvement. These messages may be sent as messages addressing all entities in a certain environment such that other potential responders can overhear/receive the message and re-evaluate their potential improvement levels.

Figure 3:
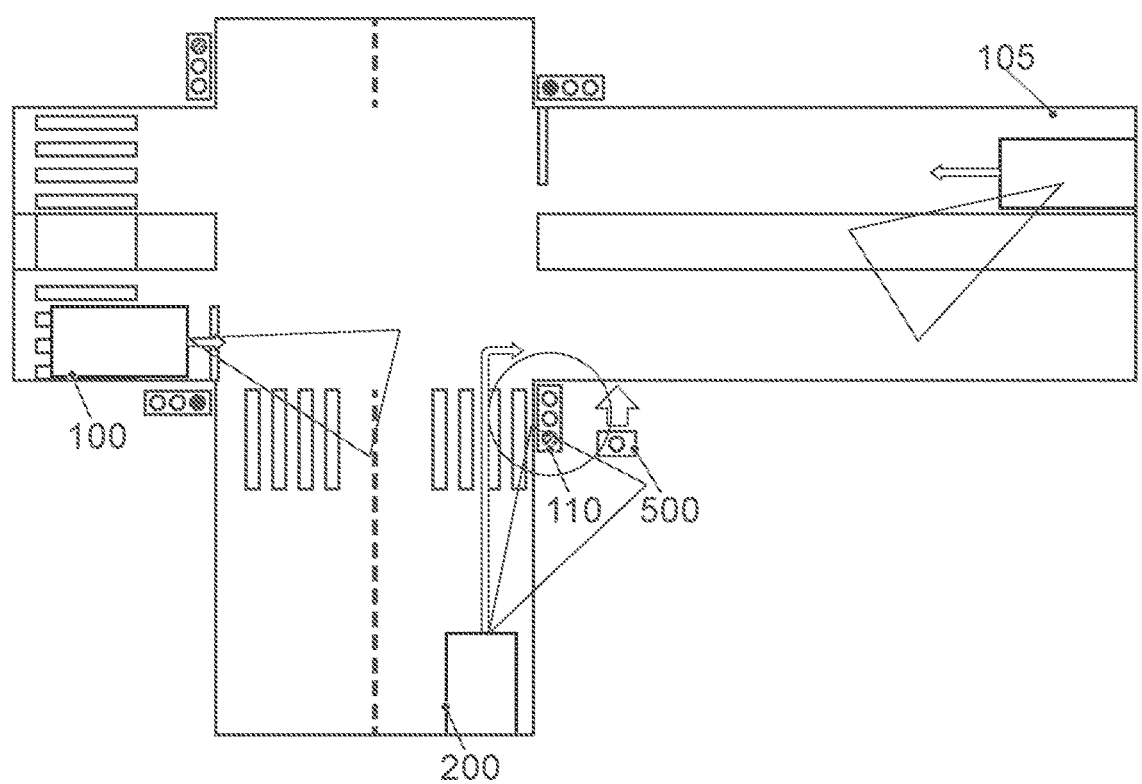
FIG. 3 illustrates a scenario in which a transportation vehicle requests further information on an object in an exemplary embodiment.

FIG. 3 illustrates a scenario in which a transportation vehicle requests further information on an object in an exemplary embodiment. The object in this disclosed embodiment may be a human. FIG. 3 depicts an example where transportation vehicle 200 request further information about an object 500, which might cross its future trajectory (the transportation vehicle 200 intends to take a left at the intersection and object 500 may cross). Therefore, transportation vehicle 200 broadcasts a request message, e.g., movement profile with a correctness probability of 50% as threshold from its own correctness probability. It is further assumed that transportation vehicles 100, 105 receive the request and infrastructure 110 (smart traffic light) would also receive the request.

In case of no delays, transportation vehicle 100 would confirm with 30% probability, the infrastructure 110 would send its data with 90% confidence probability; transportation vehicle 105 would send its with 70% probability and so on. Transportation vehicle 200 would then use the data with the highest confidence probability from the infrastructure 110. A problem here is that a lot of communication traffic arises which could also lead to further delays. For example, the data from transportation vehicles 100, 105 could be delayed. Note that transportation vehicle 200 (requester) needs to get response as soon as possible (time critical).

In an exemplary embodiment each receiving entity 100, 105, 110 will calculate a response delay depending on its own confidence probability. For example:

a. Infrastructure 110: confidence probability 90%->delay 5 ms b. Transportation vehicle 105: confidence probability 70%->delay 10 ms c. Transportation vehicle 100: confidence probability 30%->below confidence probability threshold of requester Hence, the infrastructure 110 sends the data first after 5 ms. In the case the infrastructure 110 does not exist or has a lower probability, transportation vehicle 105 waits 10 ms and if it does not receive anything it finally sends its estimates. Transportation vehicle 100 would not reply anyway as its confidence probability is below the threshold of transportation vehicle 200.

As this example demonstrates, the signaling overhead can be controlled by applying improvement dependent delay to the response messages.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for a traffic entity and for updating a first environmental model at a transportation vehicle
12 receiving information related to the first environmental model from the transportation vehicle
14 obtaining information related to a second environmental model of the transportation vehicle at the traffic entity
16 determining information related to a confidence improvement of the first information based on the second information
18 determining a delay based on the information related to the confidence improvement
20 transmitting the second information to the transportation vehicle based on the delay
30 apparatus for a traffic entity
32 one or more interfaces
34 control module
40 apparatus for a traffic entity
42 one or more interfaces
44 control module
100 transportation vehicle
105 transportation vehicle
110 traffic entity
200 transportation vehicle
400 mobile communication system
500 object

The invention claimed is:

1. A traffic entity apparatus for updating a first environmental model at a transportation vehicle, the apparatus comprising:
one or more interfaces for communicating in a mobile communication system; and
a control module for controlling the apparatus to:
receive information related to the first environmental model from the transportation vehicle, wherein the first environmental model includes at least first information on an object in an environment of the transportation vehicle, and wherein the first environmental model includes confidence information related to the first information;
obtain information related to a second environmental model of the transportation vehicle, wherein the second environmental model includes at least second information on the object in the environment of the transportation vehicle, and wherein the second environmental model includes confidence information related to the second information;
determine confidence improvement information indicating an amount of improvement of the confidence information for the first information based on analysis of the obtained second information, wherein the confidence improvement information pertains to the improvement of the confidence information for the first information based on the obtained second information;
determine a time delay to delay transmission of the second information to the transportation vehicle based on the determine confidence improvement information; and
transmit the second information to the transportation vehicle based on the determined time delay,
wherein the confidence improvement information indicates by how much a confidence on the existence or a property of the object is improved in the first environmental model based on the second information, and
wherein the higher the confidence improvement level the shorter the time delay for transmission of the second information to the transportation vehicle.

2. The apparatus of claim 1, wherein the obtaining includes determination of the information on the second environmental model based on sensor data of the traffic entity.

3. The apparatus of claim 1, wherein the obtaining includes receipt of one or more messages with information related to the second environmental model from other transportation vehicles.

4. The apparatus of claim 1, wherein the control module is further configured to control the apparatus to:
determine updated information on the first environmental model of the transportation vehicle;
re-determine the confidence improvement information based on the updated information before the transmitting;
re-determine the delay based on the re-determined confidence improvement information; and
transmit the second information to the transportation vehicle based on the re-determined time delay.

5. The apparatus of claim 4, wherein the control module is further configured to control the apparatus to overhear a broadcast message from another traffic entity as a response to the message from the transportation vehicle and/or receiving a subsequent message to determine the updated information on the first environmental model of the transportation vehicle.

6. The apparatus of claim 1, wherein the confidence information is determined by a confidence percentage and wherein the delay is based on an absolute improvement of the confidence percentage.

7. The apparatus of claim 1, wherein the control module is further configured to control the apparatus to transmit the second information to the transportation vehicle in response to the confidence improvement being above a threshold and refraining from transmitting the second information to the transportation vehicle in response to the confidence improvement not being above a threshold.

8. The apparatus of claim 1, wherein the object is in conflict with a trajectory of the transportation vehicle.

9. The apparatus of claim 1, wherein the first object is a dynamic object.

10. The apparatus of claim 1, wherein the message is a broadcast message.

11. A transportation vehicle comprising the apparatus of claim 1.

12. A method for a traffic entity and for updating a first environmental model at a transportation vehicle, the method comprising:
receiving information related to the first environmental model from the transportation vehicle, wherein the first environmental model includes at least first information on an object in an environment of the transportation vehicle, and wherein the first environmental model includes confidence information related to the first information;
obtaining information related to a second environmental model of the transportation vehicle, wherein the second environmental model includes at least second information on the object in the environment of the transportation vehicle, and wherein the second environmental model comprising includes confidence information related to the second information;

determining confidence improvement information indicating an amount of improvement of the confidence information for the first information based on analysis of the obtained second information, wherein the confidence improvement information pertains to the improvement of the confidence information for the first information based on the obtained second information;

determining a time delay to delay transmission of the second information to the transportation vehicle based on the determine confidence improvement information; and transmitting the second information to the transportation vehicle based on the determined time delay, wherein the confidence improvement information indicates by how much a confidence on the existence or a property of the object is improved in the first environmental model based on the second information, and wherein the higher the confidence improvement level the shorter the time delay for transmission of the second information to the transportation vehicle.

13. The method of claim 12, wherein the obtaining comprises determining the information on the second environmental model based on sensor data of the traffic entity.

14. The method of claim 12, wherein the obtaining comprises receiving one or more messages with information related to the second environmental model from other transportation vehicles.

15. The method of claim 12, further comprising:
determining updated information on the first environmental model of the transportation vehicle;
re-determining the confidence improvement information based on the updated information before the transmitting;
re-determining the time delay based on the re-determined confidence improvement information; and
transmitting the second information to the transportation vehicle based on the re-determined time delay.

16. The method of claim 15, further comprising overhearing a broadcast message from another traffic entity as a response to the message from the transportation vehicle and/or receiving a subsequent message to determine the updated information on the first environmental model of the transportation vehicle.

17. The method of claim 12, wherein the confidence information is determined by a confidence percentage and wherein the delay is based on an absolute improvement of the confidence percentage.

18. The method of claim 12, further comprising transmitting the second information to the transportation vehicle in response to the confidence improvement being above a threshold and refraining from transmitting the second information to the transportation vehicle in response to the confidence improvement not being above a threshold.

19. The method of claim 12, wherein the object is in conflict with a trajectory of the transportation vehicle.

20. The method of claim 12, wherein the first object is a dynamic object.

21. The method of claim 12, wherein the message is a broadcast message.

22. A non-transitory computer readable medium including a computer program having program code for performing a method for a traffic entity and for updating a first environmental model at a transportation vehicle, when the computer program is executed on a computer, a processor, or a programmable hardware component, wherein the method comprises:

receiving information related to the first environmental model from the transportation vehicle, wherein the first environmental model includes at least first information on an object in an environment of the transportation vehicle, and wherein the first environmental model includes confidence information related to the first information;

obtaining information related to a second environmental model of the transportation vehicle, wherein the second environmental model includes at least second information on the object in the environment of the transportation vehicle, and wherein the second environmental model includes confidence information related to the second information;

determining confidence improvement information indicating an amount of improvement of the confidence information for the first information based on analysis of the obtained second information, wherein the confidence improvement information pertains to the improvement of the confidence information for the first information based on the obtained second information;

determining a time delay to delay transmission of the second information to the transportation vehicle based on the determine confidence improvement information; and transmitting the second information to the transportation vehicle based on the determined time delay, wherein the confidence improvement information indicates by how much a confidence on the existence or a property of the object is improved in the first environmental model based on the second information, and wherein the higher the confidence improvement level the shorter the time delay for transmission of the second information to the transportation vehicle.

* * * * *